United States Patent [19]

Dusenbury et al.

[11] 4,431,759

[45] Feb. 14, 1984

[54] POLYESTER TEXTILE MATERIALS RESISTANT TO UNDESIRABLE FIBRILLATION

[75] Inventors: Joseph H. Dusenbury, Spartanburg; Dmitry M. Gagarine, Gaffney, both of S.C.

[73] Assignee: Milliken Research Corporation, Spartanburg, S.C.

[21] Appl. No.: 309,693

[22] Filed: Oct. 8, 1981

[51] Int. Cl.³ .......................... C08K 5/06; C08L 67/02
[52] U.S. Cl. ................................. 524/108; 8/DIG. 4; 524/601; 524/605
[58] Field of Search ............. 8/DIG. 4; 524/108, 601, 524/605

[56] References Cited

U.S. PATENT DOCUMENTS

| | | | |
|---|---|---|---|
| 3,872,000 | 3/1975 | Hamada et al. | 210/732 |
| 3,880,794 | 4/1975 | Iida et al. | 524/108 |
| 4,016,118 | 4/1977 | Hamada et al. | 524/108 |
| 4,087,242 | 5/1978 | Frank et al. | 8/DIG. 4 |
| 4,294,747 | 10/1981 | Su | 524/108 |

*Primary Examiner*—Ronald W. Griffin
*Attorney, Agent, or Firm*—Terry T. Moyer; H. William Petry

[57] ABSTRACT

A partially oriented yarn is provided which comprises a polyester resin and a cyclic acetal of sorbitol and an aromatic aldehyde, said cyclic acetal being present in an amount sufficient to reduce undesired fibrillation and frosting of textile materials made from such yarns which have been drawn and textured.

10 Claims, No Drawings

POLYESTER TEXTILE MATERIALS RESISTANT TO UNDESIRABLE FIBRILLATION

The present invention relates to partially oriented yarns made from polyester resin compositions, textured yarns made from such partially oriented yarns and textile fabrics made therefrom.

Since the late 1960's, fabrics made from textured polyester yarns have gained a large share of the textile apparel market. The good acceptance of textured polyester resulted from properties such as its excellent wear performance, freedom from wrinkling, good bulk and drape, "easy care," and newness retention.

Initially, most textured polyester was made by a route which involved spinning and drawing of a feed yarn by a fiber producer followed by texturing of this drawn yarn by a throwster. Then in the late 1960's and early 1970's it was suggested that the previously separate steps of drawing and texturing might be combined into a single operation. Several polyester fiber producers took advantage of this technology to integrate forward into the textured yarn business by combining drawing on false twist texturing machines.

Unfortunately, attempts by throwsters to perform this combined operation of drawing and texturing were complicated by the relatively short shelf-life of undrawn polyester yarns which were supplied by the fiber producers for this operation. Then, as a result of research by a major fiber producer, a new yarn was developed that had the age stability necessary to permit throwsters to use and realize the advantages of the draw-texturing process. This yarn has been referred to as Draw-Texturing Feed Yarn (DTFY), and partially oriented yarn POY). For convenience, these yarns will be referred to herein as POY yarns. In general POY yarns may be distinguished by a higher level of orientation than undrawn yarn while retaining a low level of crystallinity. The higher level of crystallinity of POY yarns has been reported to be the reason for their improved thermal and age stability over undrawn yarns. (See Shealey, O. C., et al. "An Age-Stable Feed Yarn for Texturing by the False-Twist Process", Textile Research J. 45, 112–117 (1975)).

Unfortunately, a significant problem has recently been observed in textile fabrics made from POY yarns. When such textile fabrics are subjected to multiple dry cleanings in, for instance, perchloroethylene containing solvents, or when the fabrics are laundered repeatedly in industrial-type, strongly alkaline conditions the yarns may tend to become unevenly and undesirably fibrillated which results in a "frosty" appearance of the fabric which may tend to manifest itself, for instance, along seams or in other undesirable locations. This frosty appearance may be particularly noticeable in fabrics dyed in dark shades such as those found in men's suits and trousers, etc. Accordingly, it would be very desirable to provide textile fabrics made from partially oriented yarns which may avoid undesirable fibrillation and which may not become "frosty" after repeated launderings and dry cleanings. The present invention is directed to the minimization or even complete elimination of those problems.

According to the present invention a partially oriented yarn is provided which comprises a polyester resin and a cyclic acetal of sorbitol and an aromatic aldehyde, said cyclic acetal being present in an amount sufficient to reduce undesired fibrillation and frosting of textile materials made from such yarns which have been drawn and textured. Sufficient amounts may be from about 0.01 to about 2 percent, preferably from about 0.05 to about 1.5 percent by weight based on the weight of the polyester resin.

Cyclic acetals which may be employed pursuant to the present invention in general may be selected from the polyhydric alcohol acetals of benzaldehyde or its nucleically substituted derivatives, said polyhydric alcohols having 5 to 7 hydroxyl groups.

In the molecular structures of the cyclic acetal compounds defined above, the alcohol portion which is acetalized by unsubstituted or substituted benzaldehyde preferably is a sugar alcohol of the formula, $HOCH_2(CHOH)_nCH_2OH$, wherein n is 3 to 5, preferably 3 to 4, such as xylitol, sorbitol or mannitol. Preferable as the ring substituents for benzaldehyde are halogen, alkyl groups with 1 to 8 carbon atoms and preferably with 1 to 4 carbon atoms, alkoxy groups with 1 to 8 carbon atoms and preferably with 1 to 4 carbon atoms. A number of examples are given below.

Dibenzylidene-zylitol (=xylitol acetal of benzaldehyde), dibenzylidene-sorbitol (=sorbitol acetal of benzaldehyde) and dibenzylidene-mannitol (=mannitol acetal of benzaldehyde), as well as their derivatives wherein the benzene nucleus in either one or both of two benzylidene moieties has been substituted with chlorine, bromine, an alkyl group (e.g., methyl, ethyl, propyl, isopropyl, n-butyl, isobutyl, sec-butyl, octyl, etc.) and/or an alkoxy group (e.g., methoxy, ethoxy, n-propoxy; isopropoxy, butoxy, octoxy, etc.)

One of these typical cyclic acetals has the following chemical structure:

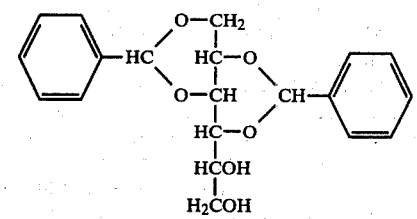

1,3;2,4-dibenzylidene-sorbitol (1,3;2,4 sorbitol acetal of benzaldehyde.

In the above-mentioned cyclic acetal compound, the alcohol portion thereof is sorbitol, and the aldehyde portion thereof is benzaldehyde.

Dibenzylidene sorbitol (DBS), the preferred compound for use in the polyester resin compositions according to the present invention, is known as a gelling agent for organic liquids (U.S. Pat. No. 3,880,794) and as a flocculating agent (U.S. Pat. No. 3,872,000) and as a modifier for polyolefin resins (U.S. Pat. No. 4,016,118.) In addition commonly-assigned U.S. Patent application Ser. No. 178,753, filed Aug. 18, 1980, now U.S. Pat. No. 4,294,747, discloses certain shapeable, thermoplastic resin compositions which are comprised of a thermoplastic, condensation polymer or polymer blend and from about 0.01 to about 2 percent by weight of a cyclic acetal as a nucleating agent.

The cyclic acetals of the present invention may be prepared by any method which per se is known for the preparation of acetals. One such method is described, for example, in Kirk-Othmer, "Encyclopedia of Chemical Technology," Vol. 1, pages 579 and 580. According to another method DBS may be prepared in a crude form, e.g., containing about 75 percent DBS and about 25 percent tribenzylidene sorbitol (TBS) by reacting d-sorbitol with a molar excess of benzaldehyde in water or certain organic liquids as a reaction medium in the presence of an acid catalyst at an elevated temperature to perform dehydrocondensation (U.S. Pat. No. 3,721,682). The crude DBS formed by this reaction may be further purified by mixing with a lower aliphatic alcohol to dissolve the impurities and then separating and recovering the undissolved DBS (U.S. Pat. No. 4,131,612). According to the present invention, however, either crude or purified DBS may be used. For instance, compositions containing about 75 percent DBS and about 25 percent TBS may be very useful.

The precise mechanism by means of which the presence of the above-described cyclic acetals may function to reduce or eliminate undesired fibrillation and frosting of the textile materials made entirely or predominantly from partially oriented yarns is not fully understood, and the invention is not to be limited by any such theory or proposed mechanism. It is believed, however, that partially oriented yarns which have been subsequently fully drawn and textured may have a different morphology than standard fully oriented yarns. Fully oriented yarns which have been textured are believed to be characterized by a large number of relatively small, but well-formed and oriented crystallites. Textured yarn products made from partially oriented yarns may be characterized by a relatively small number of comparatively large and poorly-formed crystallites. Such morphology, it is believed, may cause undesirable fibrillation of the yarns present in the textile material products during multiple dry cleanings and/or industrial launderings. It is believed that the inclusion in the polyester polymer melt prior to spinning of a cyclic acetal as characterized above may favorably change such crystallization characteristics of the yarns and improve resistance to such fibrillation and frosting.

It is furthermore believed that the cyclic acetals of the present invention may be more advantageously used than conventional nucleating agents such as sodium benzoate, sodium adipate, aluminum p-(tertbutyl)benzoate. Such agents may be undesirable for use in polyesters, because at the high temperatures involved in processing, their incipient alkalinity may cause degradation of the polyester, with lowering of its molecular weight.

In the context of the present invention the term "polyester" means any polymeric ester that has been extruded into filamentary form. Conventionally, the polyester is the reaction product of a dicarboxylic acid, or ester forming derivative of same and a glycol, e.g., dimethyl terephthalate and ethylene glycol that is condensed to form a polymer of the glycol ester of the dicarboxylic acid. Another alcohol that may be employed may be cyclohexanedimethanol. Such polyester may also contain other constituents to render the filaments extruded therefrom capable of basic dyeability, to impart antistatic properties, flame retardant properties and the like.

The present invention also relates to textured yarns made from the POY yarns, and to textile material products, especially fabrics in woven, knitted or even nonwoven form. Woven fabrics are, however, preferred. In general, the textile material products may contain a predominant amount, e.g., 60 percent or more, POY yarns which have been textured. All-polyester textile materials, especially those made entirely from textured POY polyester yarns, may be preferred.

The terms "textured" and "texturized" are used herein interchangeably to refer to an otherwise smooth, continuous partially oriented filamentary yarn which has been crimped, looped, coiled, or crinkled by any one of at least a dozen well-known techniques to impart improved properties thereto, such as stretch, luxurious bulk and improved hand. The most preferred texturized yarns of the invention are those made by false twisting of the yarn on any of the well-known and used false twist type stretch yarn machines, such as those made by ARCT, Barmag, Berliver, Davide, Guidici and others. Advantageously, the POY yarn may be simultaneously fully drawn and textured in a simple operation.

What is claimed is:

1. A partially oriented yarn which comprises a polyester resin and a cyclic acetal of sorbitol and an aromatic aldehyde; said cyclic acetal being present in an amount sufficient to reduce undesired fibrillation and frosting of textile materials made from such yarns which have been drawn and textured.

2. A textured yarn product made from a partially oriented yarn which has been fully drawn and textured, which comprises a polyester resin and a cyclic acetal of sorbitol and an aromatic aldehyde, said cyclic acetal being present in an amount sufficient to reduce undesired fibrillation and frosting of said textured yarn.

3. A textile material product which comprises a partially oriented yarn which has been fully drawn and textured, said yarn comprising a polyester resin and a cyclic acetal of sorbitol and an aromatic aldehyde; said cyclic acetal being present in an amount sufficient to reduce undesired fibrillation and frosting of said textile material product.

4. The products of claims 1, 2 or 3 wherein said cyclic acetal is selected from the polyhydric alcohol acetals of benzaldehyde or its nucleicly substituted derivatives, said polyhydric alcohols having 5 to 7 hydroxyl groups.

5. The product of claim 5 wherein said alcohol is selected from xylitol, sorbitol or mannitol.

6. The product of claim 5 wherein said ring substituents for benzaldehyde are selected from halogen, alkyl groups with 1 to 8 carbon atoms, and alkoxy groups with 1 to 8 carbon atoms.

7. The product of claim 6 wherein said cyclic acetal is dibenzylidene sorbitol.

8. A process for decreasing the tendency of textile fabrics made from partially oriented polyester yarns to become unevenly and undesirably fibrillated as a result of multiple dry cleanings or repeated launderings which comprises incorporating into said partially oriented polyester yarns a cyclic acetal of sorbitol and an aromatic aldehyde in an amount sufficient to reduce undesired fibrillation.

9. The process of claim 8 wherein the amount of cyclic acetal is from about 0.01 to 2 percent by weight, based upon the weight of the polyester resin employed to make the polyester yarn.

10. The process of claim 9 wherein said cyclic acetal is selected from the polyhydric alcohol acetals of benzaldehyde or its nucleically substituted derivatives, said polyhydric alcohols having 5 to 7 hydroxyl groups.

* * * * *

UNITED STATES PATENT AND TRADEMARK OFFICE
CERTIFICATE OF CORRECTION

PATENT NO. : 4,431,759

DATED : February 14, 1984

INVENTOR(S) : Joseph H. Dusenbury et al.

It is certified that error appears in the above-identified patent and that said Letters Patent is hereby corrected as shown below:

Col. 1, line 35, change "POY)" to --(POY)--.

Col. 2, line 19, change "alkoxy" to --alkoxyl--.

Col. 4, line 41, change "5" to --4--.

Col. 4, line 45, change "alkoxy" to --alkoxyl--.

Signed and Sealed this

Fifteenth Day of May 1984

[SEAL]

Attest:

Attesting Officer

GERALD J. MOSSINGHOFF

Commissioner of Patents and Trademarks